United States Patent
Hwang

(10) Patent No.: US 7,051,219 B2
(45) Date of Patent: May 23, 2006

(54) SYSTEM AND APPARATUS FOR ADJUSTING A CLOCK SPEED BASED ON A COMPARISON BETWEEN A TIME REQUIRED FOR A SCHEDULER FUNCTION TO BE COMPLETED AND A TIME REQUIRED FOR AN EXECUTION CONDITION TO BE SATISFIED

(75) Inventor: Se Jin Hwang, Ha Nam (KR)

(73) Assignee: LG Electronics Inc., Seoul (KR)

( * ) Notice: Subject to any disclaimer, the term of this patent is extended or adjusted under 35 U.S.C. 154(b) by 943 days.

(21) Appl. No.: 09/941,849

(22) Filed: Aug. 30, 2001

(65) Prior Publication Data
US 2002/0029353 A1  Mar. 7, 2002

(30) Foreign Application Priority Data
Sep. 1, 2000 (KR) ............................... 2000-51563

(51) Int. Cl.
G06F 1/04 (2006.01)
G06F 1/08 (2006.01)
G06F 1/32 (2006.01)

(52) U.S. Cl. ................... 713/320; 713/322; 713/501; 713/502; 365/227

(58) Field of Classification Search ............... 713/320, 713/322, 501, 502; 365/227
See application file for complete search history.

(56) References Cited

U.S. PATENT DOCUMENTS

| 5,325,514 | A | * | 6/1994 | Kuwa ........................ 713/502 |
| 5,815,693 | A | * | 9/1998 | McDermott et al. ........ 713/501 |
| 6,115,823 | A | * | 9/2000 | Velasco et al. ............. 713/322 |
| 6,366,522 | B1 | * | 4/2002 | May et al. ................. 365/227 |
| 6,564,328 | B1 | * | 5/2003 | Grochowski et al. ....... 713/320 |
| 6,845,456 | B1 | * | 1/2005 | Menezes et al. ........... 713/320 |

* cited by examiner

*Primary Examiner*—Chun Cao
*Assistant Examiner*—Mark Connolly
(74) *Attorney, Agent, or Firm*—Fleshner & Kim, LLP

(57) ABSTRACT

A method of scheduling a CPU in which a clock of the CPU is controlled depending upon the states of processes to reduce power consumption. The clock is controlled by substituting clock functions of an embedded system into a scheduler function, comparting a wait time until a scheduling is completed with the sum of an execution time given for satisfying a real-time condition and an error range of a permissible error of a scheduling, changing a clock state of a process depending on the compared result, calculating an elapsed time with respect to a difference between the changed scheduling clock and a scheduling clock before the change of clock to control the wait time Wk and setting the clock of the CPU using the value of a newly determined clock.

19 Claims, 2 Drawing Sheets

SYSTEM AND APPARATUS FOR ADJUSTING A CLOCK SPEED BASED ON A COMPARISON BETWEEN A TIME REQUIRED FOR A SCHEDULER FUNCTION TO BE COMPLETED AND A TIME REQUIRED FOR AN EXECUTION CONDITION TO BE SATISFIED

BACKGROUND OF THE INVENTION

1. Field of the Invention

The present invention relates to a method of scheduling a central processing unit (hereinafter, referred to as "CPU") to minimize power consumption.

2. Background of the Related Art

Power management of microprocessors in the related art usually require extra hardware or require supplying a large amount of power to the microprocessors regardless of the power consumption of the microprocessors. FIG. 1 illustrates a related art combination of a microprocessor and the extra hardware required to control the power consumption for MSM family chips. FIG. 1 exhibits CPUs 1, 10, 100, e.g. MSMs 3100, fabricated by Qualcomm Co., a monitoring section 50 for monitoring the operating states of the CPUs 1, 10, 100, and a control section 40, e.g. a PM 1000 for controlling the CPUs 1, 10, 100 in response to an output signal generated from the monitoring section 50. Also, in this related art example, the commercial operating system (OS), and other partial real-time operating system do not care about the power consumption by the CPUs 1, 10, 100.

The system illustrated in FIG. 1 initiates operation with a monitoring section 50 monitoring the operating states of the CPUs 1, 10, 100 and then applying an output signal from the monitoring sections to the control section 40 according to the monitored result. The control section 40 then receives the output signal from the monitoring section 50, and controls the operating states of the multi-CPUs 1, 10, 100, wherein the operating states can be Run, Wait, Sleep, or Ready, etc., based on the received data to adjust the use of power (power supply) of the CPU.

However, in the case of such a related art method for adjusting power consumption of the CPU, the monitoring section 50 receives an output signal indicating the operating states of multi-CPUs 1, 10, 100 therefrom and then applies the output signal to a separate hardware, wherein the control section 40 controls the power consumption of the CPU. This additional control section 40 leads to an increase in manufacturing costs due to the extra hardware, as well as, an increase in the a complexity of the manufacturing process.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the invention is to solve at least the above-mentioned problems and/or disadvantages by providing a CPU scheduling method and apparatus in which regional variables Wk, Tk, Ck, Ek, etc. and a clock of an embedded system are inputted to control a clock of the CPU depending on the operating states (i.e., Run, Wait, Sleep) of processes, where power consumption is changed using values of the regional variables according to the states of processes.

Another object of the present invention is to provide CPU scheduling in which a clock of the CPU is controlled depending upon the states of processes to reduce power consumption by substituting clock functions of an embedded system into a scheduler function, comparing a wait time until a scheduling is completed with the sum of an execution time given for satisfying a real-time condition and a permissible error range, changing a clock state of a process depending on the compared result, calculating an elapsed time with respect to a difference between the changed scheduling clock and a scheduling clock before the change of clock to control the wait time, and setting the clock of the CPU using the value of a newly determined clock.

Another object of the present invention is to provide an apparatus for scheduling a CPU with a CPU adapted to control the overall operation of an embedded system equipped with a PLL to set an operating clock of the CPU and an operating software (S/W) that is controlled by controller and including an application in the form of a process and an operating system (OS), where the operating system (OS) has a scheduler adapted to monitor states of all the processes executed on the CPU and to control the clock of the CPU depending on the monitored result of the states of the processes, and where a memory can be connected to the CPU and the operating S/W.

Another object of the present invention is to provide a method where operating states of processes that are determined and managed by scheduler are monitored through the use of a clock function of an embedded system to supply a differential power to each process so that only a minimum clock is maintained while satisfying real-time conditions of the processes, thereby making it possible to use a power supply for a long period of time in the embedded system, etc.

Another object of the present invention is to provide a method of scheduling a CPU in which a clock speed of the CPU is controlled depending upon the states of processes to reduce power consumption, by substituting clock functions of an embedded system into a scheduler function, comparing a wait time until a scheduling is completed with the sum of an execution time given for satisfying a real-time condition and an error range of a permissible error of a scheduling, changing a clock speed state of a process depending on the compared result, calculating an elapsed time with respect to a difference between the changed scheduling clock and a scheduling clock before the change of clock speed state to control the wait time, and setting the clock speed of the CPU using the value of a newly determined clock speed.

Another object of the present invention is to provide an apparatus for scheduling a CPU with a CPU adapted to control the overall operation of an embedded system, the CPU being equipped with a PLL for controlling an operating clock of the embedded system and maintaining a clock for a real-time control within the CPU, an operating S/W including an application in the form of a process and an operating system (OS), the operating system (OS) having a scheduler adapted to monitor states of all the processes executed on the CPU and to control the clock of the CPU depending on the monitored result of the states of the processes, and a memory connected to the CPU and the operating S/W.

Another object of the present invention is to provide a method of controlling a CPU to control power consumption by setting a clock speed to a predetermined value, measuring a wait time for scheduling to be completed, measuring an executing time for satisfying a real-time condition, determining whether the wait time is more than the executing time, and changing the amount of power supplied to the CPU, wherein if the wait time is mote than the executing time, the power supplied is increased and wherein if the wait time is less than the executing time, the power supplied to the CPU is decreased.

Another object of the present invention is to provide a method of controlling power consumption in a CPU by controlling a scheduling of the CPU by substituting a system check function of a process into a scheduler function of a clock, determining a first amount of time required for the scheduler function of the clock to be executed, determining a second amount of time required for a real time condition to be satisfied, determining whether the first amount of time is greater than the second amount of time, and changing the clock speed of a process, wherein the clock speed is increased if the first time is greater than the second time and the clock speed is decreased if the first time is less than the second time.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
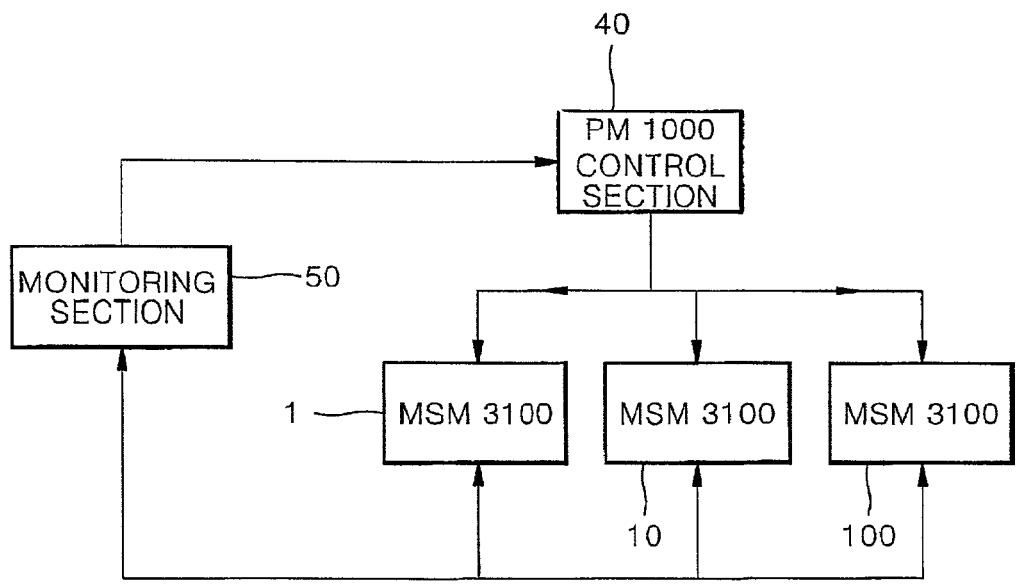
FIG. 1 is a block diagram illustrating a CPU operation controlling system according to the related art.
Figure 2:
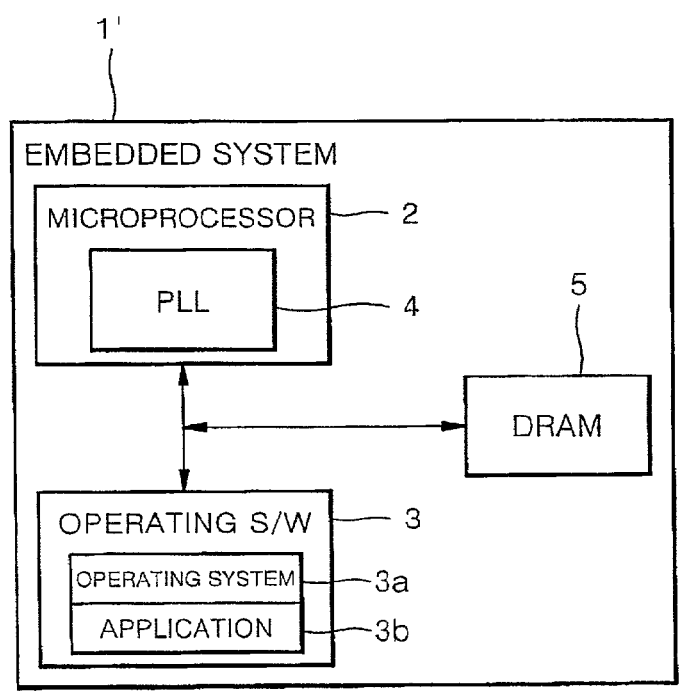
FIG. 2 is a block diagram illustrating the construction of an embedded system on which a preferred embodiment of the present invention is implemented.

FIG. 2 is a block diagram illustrating the construction of an embedded system 1 in accordance with a preferred embodiment of the present invention. Referring to FIG. 2, an embedded system 1' preferably includes a microprocessor or CPU 2, e.g. built therein for controlling the overall operation of the embedded system 1', an operating software/system (S/W) 3 for operating the embedded system 1', and a memory 5 for storing information, time conditions, a queue and a scheduler queue.

The CPU 2 can be equipped with a PLL 4 for controlling an operating clock of the embedded system 1'. The PLL 4 can also be used for maintaining a clock for real-time control within the CPU 2.

The operating S/W 3 can include an application 3b in the form of a process of using the CPU 2 and an operating system (OS) 3a and can have a scheduler that can be a core part of the operating S/W 3. The scheduler of the operating system (OS) 3a can function to monitor states of all the processes executed on the CPU 2 and can control the clock of the CPU depending on the recognized result of the states of the processes. A separate Queue of states, i.e., Run, Wait, or Sleep, can be maintained depending on each state Run, Wait, Sleep, or Idle, etc., of the processes in the operating system (OS) 3a.

A plurality of processes can execute the operation of the CPU 2 within the operation S/W 3 of the embedded system 1 and the processes can be included in a scheduler of the operating system 3a of the operating S/W 3 of FIG. 2. For this reason, in order to maintain the performance of the plurality of processes having different states, the scheduler of the operating system 3a and the CPU 2 can be used to maintain the performance of the clock of the CPU 2. Meanwhile, when each of the processes Pj, Pk, etc., is produced, a Time Quantum for the scheduling can be designated, which can be recognized as a scheduling variable to the scheduler.

Figure 3:
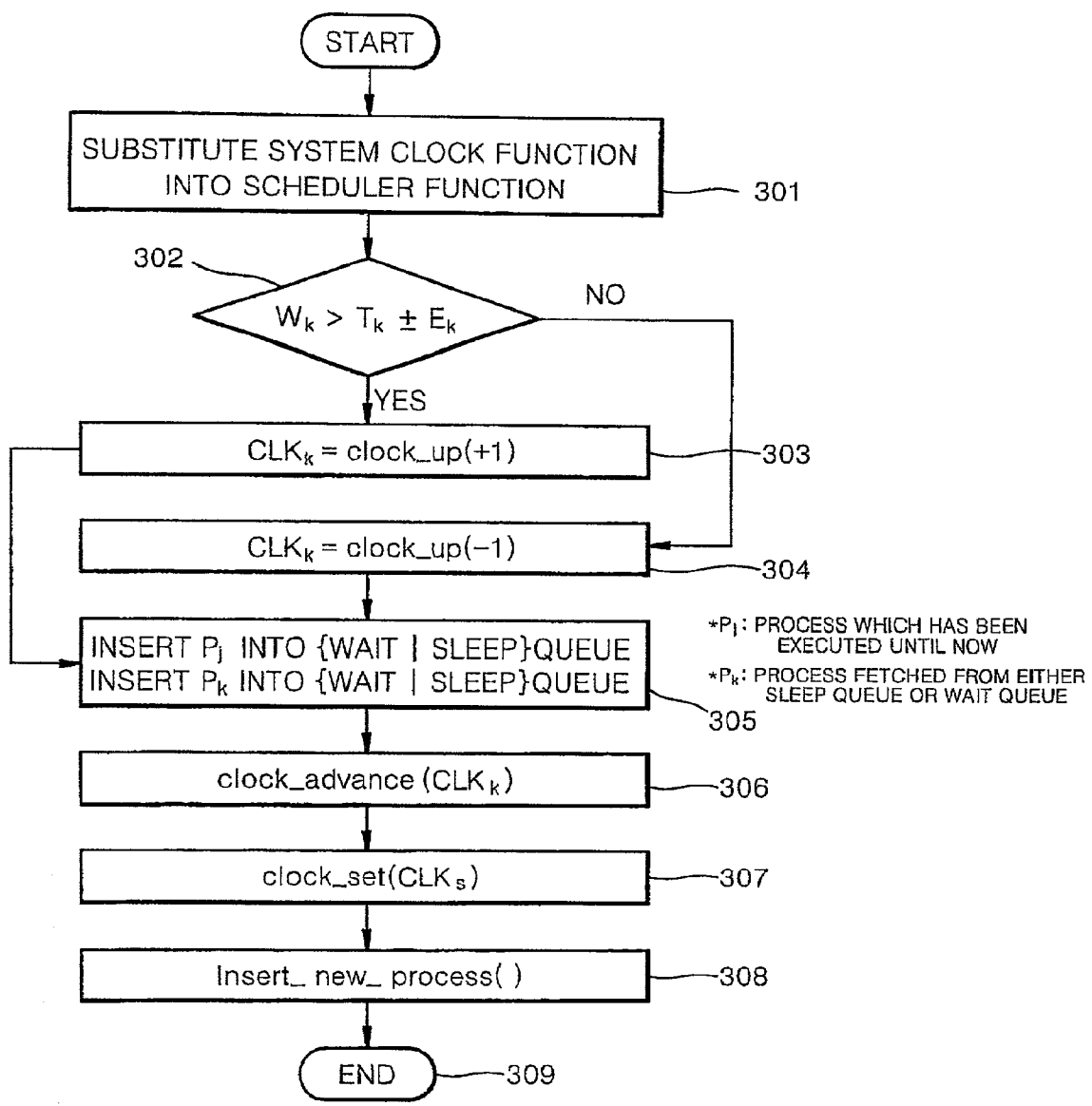
FIG. 3 is a flow chart illustrating a CPU scheduling method according to a preferred embodiment of the present invention.

FIG. 3 is a flow chart illustrating a preferred embodiment of the present invention for performing a CPU scheduling method. First, a conversion of states Run, Wait, Sleep of a plurality of processes according to the present invention can be performed. Initially, just before the execution of the scheduler function of the operating system (OS) 3a is completed, a function for determining a clock of an embedded system 1 can be added so that the scheduler changes the states of the process based on monitored results at scheduling tine. This can be accomplished by applying a main power supply voltage to a changed process, i.e., a process of a Run state, and applying a second power supply voltage to a process corresponding to a Wait or Sleep state so that power can be used efficiently.

Various CPU clocks can be used because the power concentration is not determined by the type of a clock used, but rather the present invention involves using a clock by adjustably selected from among previously determined clock settings. For example, a global variable CLKt can be used as the variable for a CPU clock available in a system of the present invention, and information associated with a clock with an arbitrary process Pk as a regional variable can also include the variables CLKk, Tk, Ck, Wk. Ek, etc. Here, CLKk can denote a set of CPU clocks corresponding to a process k, Tk can denote an execution time given for satisfying a real-time condition, Ck can denote a time during which a process has been executed, Wk can denote a wait time until a scheduling is completed, and Ek can denote a permissible error of a scheduling.

Based upon the variables mentioned above, a control function of the process clock Clock_up( ) can be used to control a corresponding process clock. If the function Clock_up( ) increases and becomes Clock_up(+1), a first clock element after CLKk, which a process Pk has in a current Wait queue, can be used to increase the clock speed. On the other hand, if the function Clock_up( ) decreases and becomes Clock_up (−1), a second clock element before CLKk, which the process Pk has used thus decreasing the clock speed. As can be seen from the above description, when the system uses the first clock element when the control function of the process clock increases, the clock can become faster, but when the second clock element where the control function of the process clock decreases, the clock can become slower.

Another control function is a control function of the real time clock Clock_advance( ), which can be used to control a real-time clock for each of the processes existing in Run queue, Sleep queue and Wait queue. That is, the function Clock_advance( ) can be a function in which a wait time Wk of each of the processes can be controlled after calculating the elapsed time between a preceding scheduling clock and a current scheduling clock determined during the scan of all the existing processes. A third control function is a control function for setting a clock Clock_set( ), which can be a function which sets a clock of the CPU using a newly determined clock CLKs value to change a clock of the embedded system 1.

A fourth function is the function Insert_new_process( ), which can be used to initialize a corresponding regional variable when a new process is selected and thus enters the Run queue within the embedded system 1. The function Insert_new_process( ) can be a function in which a regional variable CLKs can be initialized to a CLK0 value with respect to a newly inserted process Ps, and Ts can be given from a user and Ws is also set to 0.

The system illustrated in FIG. 3 operates by first setting the scheduling algorithm on the assumption that a first process Pj can be a currently running process and a second process Pk can be a process which can be fetched from either a Sleep queue or a Wait queue. At step 301, the clock functions Tk, Ck, Wk and Ek, Clock_up(+1), Clock_advance( ), Clock_set( ), and insert_new_process( ) of an embedded system for operating an algorithm of the present invention can be substituted into a scheduler function. The clock functions can then be used to control the clocks of all the processes which are included in a scheduler of the operating system 3a of the operating S/W of FIG. 2 and can be executed on the CPU 2.

In step 302, a wait time Wk, which is until a scheduling is completed, can be compared with the sum of an execution time Tk given for satisfying a real-time condition and an error range of a permissible error Ek of a scheduling using the substituted clock functions of step 301. If in step 302, the wait time Wk is larger than the sum of the execution time Tk and the error range of the permissible error Ek, then in step 303, the set of CPU clocks corresponding to the process CLKk increases the control function of the process clock to Clock_up(+1) so that a clock (Pj: Wait/Sleep process) which is one step-higher than a current clock state (Pj: a process which has been <run> until now) is set in step 305.

On the other hand, if in step 302, the wait time Wk is not larger than the sum of the execution time Tk and the error range of the permissible error Ek, then in step 304 the set of CPU clocks corresponding to the process CLKk decreases the control function of the process clock Clock_up(−1) so that a clock (Pk: a Run process) which is one step-lower than a current clock state (Pk: Wait or Sleep process) is set in step 305. As a result, the clock states of the processes can be changed.

At step 306, the control function of the real time clock Clock_advance( ) can be set as a function in which an elapsed time for a difference can be calculated between a preceding scheduling clock and a current scheduling clock determined during the scan of all the existing processes. This calculation is determined by the control function Clock_advance( ) for controlling a real-time clock of each of the processes existing in Run queue, Sleep queue and Wait queue so that a wait time Wk of each of the processes can be controlled to perform step 302.

In step 307, the clock of the CPU can be set to Clock_set( ) for changing a clock of the embedded system 1 using both the wait time Wk, controlled at the step 306, and the values of the regional variables Tk, Ck, Ek or CLKk, which are the newly determined clock values. Then, at step 308, when a newly inserted process is Ps, a regional variable CLKs in a system clock function can be initialized to a CLK0 value wit respect to the newly inserted process Ps, Ts can be given from a user, and Ws can be set to 0 through the function Insert_new_process( ) for initializing a corresponding regional variable when a process enters Run queue within the embedded system 1.

As can be seen from the foregoing, according to a preferred embodiment of the present invention, a clock of the CPU can be controlled depending upon the states of processes through the use of a clock function of an embedded system so that differential power can be supplied to each of the processes. This avoids supplying power of a large capacity to all the processes, thereby efficiently using a power supply of the CPU to minimize power consumption.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of scheduling a CPU in which a clock speed of the CPU is controlled depending upon the states of processes, comprising:
   substituting clock functions of an embedded system into a scheduler function;
   comparing a wait time until a scheduling is completed with the sum of an execution time given for satisfying a real-time condition and an error range of a permissible error of a scheduling;
   changing a scheduling clock state of a process depending on the compared result;
   calculating an elapsed time with respect to a difference between the changed scheduling clock and a scheduling clock before the change of scheduling clock state to control the wait time; and
   setting the clock speed of the CPU using a value of a newly determined clock speed from the calculated elapsed time.

2. The method according to claim 1, wherein if the wait time is larger than the sum of the execution time and the error range of the permissible error then the scheduling clock state is set one step-higher than the current scheduling clock state before the change of scheduling clock state, and if the wait time is not larger than the sum of the execution time and the error range of the permissible error, then a scheduling clock state is set one step-lower than the current scheduling clock state before the change of scheduling clock state.

3. The method according to claim 1, wherein when the current scheduling clock state is Sleep or Wait, a one step higher a clock state is Sleep/Wait, and a one step lower clock state is Run.

4. The method according to claim 1, wherein the states of the processes comprise Run, Wait, or Sleep.

5. The method according to claim 1, wherein the clock functions of the embedded system comprise execution time given, prosecution time, wait time, permissible error, control of a process clock, a clock element, a real time clock, a clock of the CPU, and a new process function.

6. The method according to claim 5, wherein the new process function is used to initialize a corresponding regional variable when a process enters Run queue within the embedded system.

7. The method according to claim 6, wherein when a newly inserted process is set to a first predetermined value, a first regional variable in a system clock function is initialized to a second predetermined value, a second regional variable is given by a user, and a third regional variable set to 0.

8. An apparatus for scheduling a CPU, comprising:
  a CPU adapted to control operations of an embedded system, the CPU being equipped for controlling an operating clock of the embedded system and maintaining a clock for a real-time control within the CPU; and
  a controller configured to have applications for executing on the CPU and an operating system (OS); the operating system (OS) having a scheduler adapted to monitor states of processes executed on the CPU and to control the clock of the CPU depending on the monitored result of the states of the processes, wherein the controller is configured to determine a first amount of time required for a scheduler function to be completed, determine a second amount of time required for an execution condition to be satisfied, and change a clock speed of a process in accordance with a comparison of the first and the second amounts of time.

9. The apparatus of claim 8, comprising:
  a memory coupled to the CPU and the controller, and wherein the execution condition is a real time condition.

10. The apparatus of claim 8, wherein the clock speed is increased when the first amount of time is greater than the second amount of time and the clock speed is decreased otherwise.

11. The apparatus of claim 8, wherein when the first amount of time is larger than the second amount of time, a clock state is set one step higher than a current clock state before a change of clock state, and wherein when the first amount of time is not larger than the second amount of time then the clock state is set one step lower than the current clock state before the change of clock state.

12. The apparatus of claim 11, wherein when the current clock state is Sleep or Wait, a one step higher clock state is set for Sleep/Wait.

13. The apparatus of claim 11, wherein the current clock state one step lower clock is set for Run.

14. The apparatus of claim 11, wherein the states of the processes comprise Run, Wait, or Sleep.

15. The apparatus of claim 8, wherein the clock of the CPU is controlled based on the states of the processes using a plurality of different power supply voltages of the embedded system to supply differential power to each of the processes.

16. The apparatus of claim 8, wherein the clock of the CPU is controlled based on the states of the processes using a clock function of the embedded system to supply differential power to each of the processes.

17. A method of controlling a central processing unit (CPU) to control power consumption, comprising:
  setting a clock speed of a scheduling clock to a predetermined value;
  measuring a wait time for scheduling to be completed;
  measuring an executing time for satisfying a real-time condition;
  determining whether the wait time is more than the executing time; and
  changing the clock speed of the scheduling clock, wherein if the wait time is more than the executing time, then the clock speed of the scheduling clock is increased, and wherein if the wait time is less than the executing time, then the clock speed of the scheduling clock is decreased.

18. The method of claim 12, further comprising:
  measuring an elapsed time between the times at which the level of the scheduling clock speed changes to control the wait time.

19. A method of controlling power consumption in a central processing unit (CPU) by controlling a scheduling of the CPU, comprising:
  substituting a system check function of a process into a scheduler function of a clock;
  determining a first amount of time required for the scheduler function of the clock to be executed;
  determining a second amount of time required for a real time condition to be satisfied;
  determining whether the first amount of time is greater than the second amount of time; and
  changing the clock speed of a process, wherein the clock speed is increased if the first amount of time is greater than the second amount of time and the clock speed is decreased if the first amount of time is less than the second amount of time.

* * * * *